United States Patent [19]

Brutschy

[11] 4,062,078
[45] Dec. 13, 1977

[54] HAND DRILL AND ADAPTER TOOL

[76] Inventor: John J. Brutschy, P.O. Box 1345 Old Bridge Road, Sag Harbor, N.Y. 11963

[21] Appl. No.: 703,351

[22] Filed: July 8, 1976

[51] Int. Cl.² .............................................. B25F 1/02
[52] U.S. Cl. ........................................... 7/1 R; 7/1 F; 408/122
[58] Field of Search .................. 408/122, 75, 123, 86, 408/122.5, 195; 142/53; 7/1 F, 1 R

[56] References Cited

U.S. PATENT DOCUMENTS

| 332,801 | 12/1885 | Hines | 408/123 |
| 633,880 | 9/1899 | Miller | 408/122 |
| 807,534 | 12/1905 | Barnes | 408/122 |
| 2,333,055 | 10/1943 | Terrell | 142/53 |

Primary Examiner—Leonidas Vlachos
Attorney, Agent, or Firm—Edward H. Loveman

[57] ABSTRACT

A hand drill and adapter includes an elongated adapter body which is threaded at one end and given a tapered socket at the other end. The adapter body is configured externally such that is can receive standard wrench and ratchet heads. A threaded stud member is provided which is threadable into the threaded end of the adapter body. A spring-loaded center punch is carried at one end of the threaded stud member and a cap member is removably positionable on the stud member over the center punch. The adapter body is given a set screw to releasably retain the shank of a drill bit within the socket. In a preferred arrangement the cap member is provided with handle elements to facilitate drilling in confined areas.

4 Claims, 4 Drawing Figures

U.S. Patent
Dec. 13, 1977
4,062,078
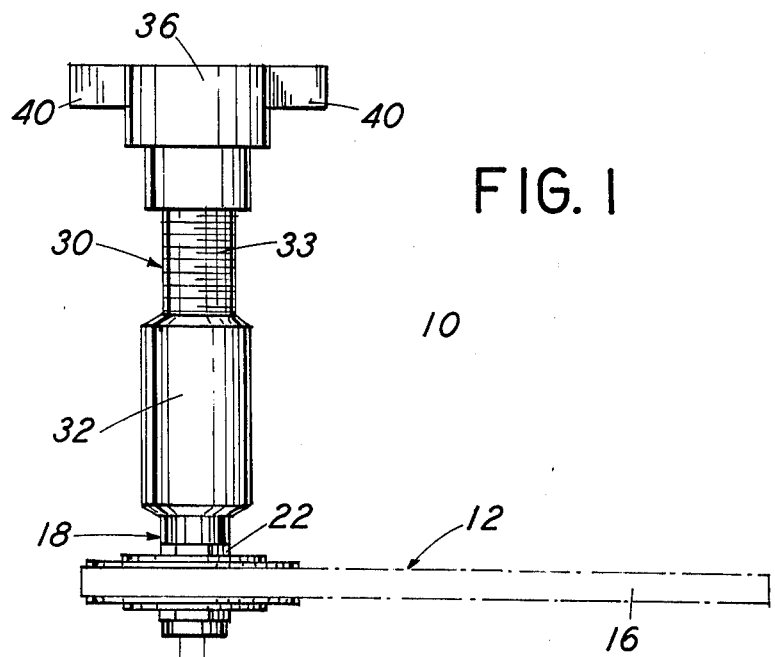
FIG. 1
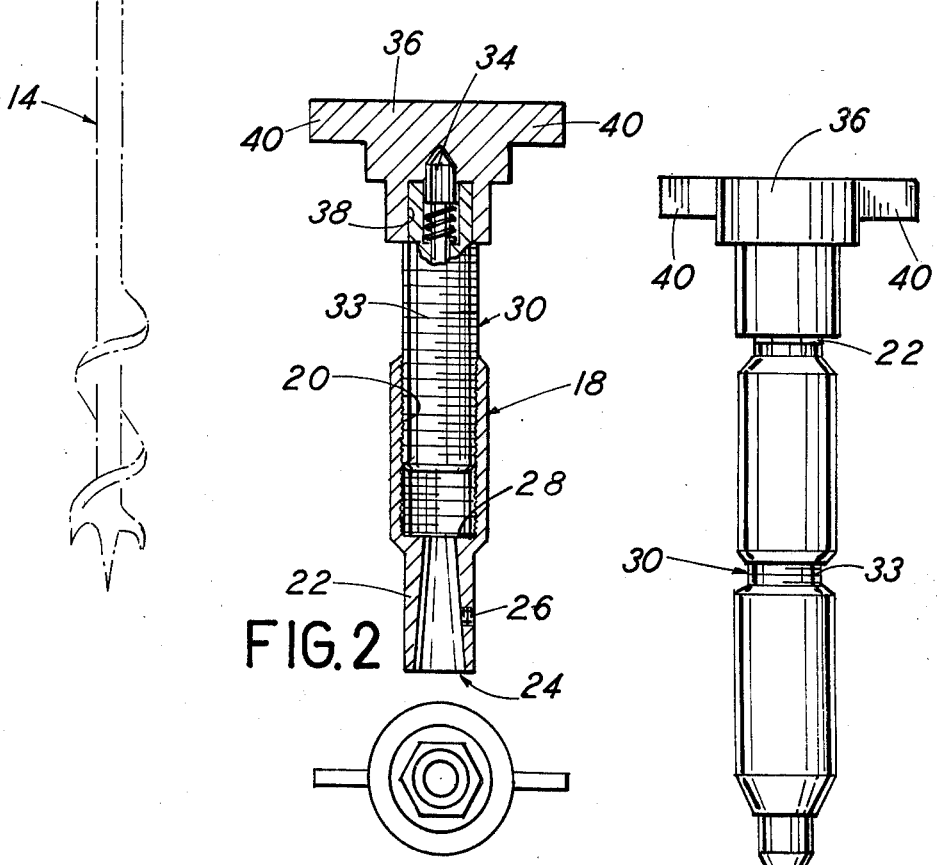
FIG. 2
FIG. 3
FIG. 4

HAND DRILL AND ADAPTER TOOL

BACKGROUND OF THE INVENTION

The present invention relates to hand drills of the ratchet-type.

Ratchet-type hand drills have been well known heretofore. One such tool is diclosed in U.S. Pat. No. 964,616 issued July 19, 1910 to D. Cortese. Although hand drills of this character appear to have been more popular prior to the advent of the electrically powered portable hand tool there is still need for such tools. One reason is that the conventional electrically powered hand tools are not generally adapted to accept a great many of auger bits, dowel sharpeners, countersinks, gimlet bits, etc. having tapered shanks. Thus, there are many accessory tools to be used in connection with the boring of holes in wood and in metal which cannot be used with the chucks normally fitted to the commercially available electrically powered tools. Further, there are occasions when a source of electrical power is not available or where the work space is so confined that the customary power drill cannot be conveniently used.

SUMMARY OF THE INVENTION

It is one object of the invention to provide a hand drill and adapter which will accommodate a wide range of drills having tapered shanks.

It is another object of the invention to provide a hand drill and adapter of the character described which can also be used as a center punch.

It is still another object of the invention to provide a hand drill and adapter of the character described which can be used in confined spaces.

Other objects and advantages of the invention will become readily apparent from the following description of the invention.

According to the present invention there is provided a hand drill and adapter tool for use with hole boring accessories having tapered shanks and comprising in combination a hollow elongated adapter body threaded internally at one end thereof and having a tapered socket at the other end thereof, said socket taper diverging towards said other end of the tool, a section of the external surface of said adapter body being polygonally configured to receive thereon standard wrenches and ratchets; a stud member threaded to threadedly engage the threaded portion of said adapter body and thereby serve as a feed screw for a hole boring accessory securable within said adapter body socket; a spring-loadable center punch integral with one end of said stud member; a cap member positionable non-rotatably and removably selectively on said one end of said stud member or in like fashion on said socket to thereby alternatively enclose said center punch and provide an impact-receiving end face therefor or expose said center punch and provide an impact-receiving end face for said socket portion of the adapter body, a pair of diametrically opposed handle elements projecting outwardly from and integral with said cap; and means for releasably locking a hole boring accessory non-rotatably within said tapered socket.

BRIEF DESCRIPTION OF THE DRAWINGS

In order that the invention may be more fully understood it will now be described, by way of example, with reference to the accompanying drawings in which:

FIG. 1 is an elevational view of a hand drill and adapter constructed in accordance with the invention and showing a drill bit in the adapter and a box end ratchet attached thereto;

FIG. 2 is an elevational cross-sectional view of the hand drill and adapter shown in FIG. 1;

FIG. 3 is a bottom plan view of the hand drill and adapter shown in FIG. 2; and

FIG. 4 is an elevational view showing a modified form of the invention.

DETAILED DESCRIPTION OF THE PREFERRED EMBODIMENT

Referring to the drawings there is shown generally, as indicated by reference numeral 10, a hand drill and adapter. A ratchet-type box end wrench 12 has been applied to the tool and a drill bit 14 has been secured in the tool. It will thus be seen that by manipulation of the handle 16 of the wrench the drill can be rotated to bore the desired hole.

The hand drill and adapter of the invention comprises a hollow elongated adapter body 18 which is internally threaded in one portion as at 20 and provided with a tapered socket 22 at the other end of the body. As can be seen most clearly from FIG. 2 the socket is given a taper which diverges towards the end 24 of the adapter body. A set screw 26 is provided in the wall of the socket and thereby permits the tapered shank of a hole boring accessory to be releasably retained within the socket. It will be understood that a wide range of accessory tools such as reamers, countersinks, gimlet bits, various types of auger bits, etc., can be inserted by means of their tapered shank into the socket of the adapter.

The adapter body is provided with an internal shoulder 28 which serves to limit penetration of the adapter body by a threaded stud 30 to be described. The adapter body is given an external polygonal configuration 32 in one section thereof such that a standard ratchet or wrench or like lever may be detachably affixed thereto for rotation of the tool in the boring of the hole. The provision of a hexagonal external surface will afford accommodation of most lever-like devices.

The hand tool includes a stud member 30 which is threaded as at 33 so as to be threadable into the adapter body. A spring-loaded center punch 34 is carried at one end of the stud member, the center punch being of the well known type whereby the spring is compressible to a predetermined degree before releasing the center punch for impact with the surface to be marked. There appears to be no reason to encumber the present specification with a detailed description of such known construction.

A cap member 36 is provided for removable positioning over the tip of the center punch. The bore 38 in the cap member may be provided with a spline groove cooperable with a key on the center punch such that once positioned over the center punch the cap is non-rotatably affixed thereto. A pair of diametrically opposed outwardly directed handle elements 40 are desirably formed on the cap member. In this manner one may manipulate the tool within a confined space which would otherwise preclude the use of a lever accessory such as a ratchet or wrench. As shown in FIG. 4 the cap member may be secured to the other end of the tool when not employed as an enclosure for the center punch and affords a gripping or impact-receiving surface during operation of the center punch.

From the foregoing it will be seen that an extremely simple tool has been provided which can be used in the boring or reaming of holes in wood or in metal, the tool having the capability of receiving a wide range of accessory tools having tapered shanks. The tool possesses versatility in being given a center punch and a handle structure which facilitates its use in cramped spaces.

I claim:

1. A hand drill and adapter tool for use with hole boring accessories having tapered shanks and comprising in combination:

a hollow elongated adaptor body threaded internally at one end thereof and having a tapered socket at the other end thereof, said socket taper diverging towards said other end of the tool, a section of the external surface of said adapter body being polygonally configured to receive thereon standard wrenches and ratchets;

a stud member thread to threadedly engage the threaded portion of said adapter body and thereby serve as a feed screw for a hole boring accessory securable within said adapter body socket;

a spring-loadable center punch integral with one end of said stud member;

a cap member positionable non-rotatably and removably selectively on said one end of said stud member or in like fashion on said socket to thereby alternatively enclose said center punch and provide an impact-receiving end face therefor or expose said center punch and provide an impact-receiving end face for said socket portion of the adapter body, a pair of diametrically opposed handle elements projecting outwardly from and integral with said cap;

and means for releasably locking a hole boring accessory non-rotatably within said tapered socket.

2. A tool according to claim 1, wherein said adapter body is provided with an internal shoulder intermediate the ends thereof for limiting penetration of the adapter body by the stud member.

3. A tool according to claim 1, wherein said external surface of said section of the adapter body is given a hexagonal configuration.

4. A tool according to claim 1, wherein said one end of said stud member and the interior of said cap are formed with coacting surfaces and an exterior portion of said socket and the interior of said cap are formed with coacting surfaces for selectively positioning said cap on either of said stud member or socket in non-rotatable relation therewith.

* * * * *